United States Patent
Kantor et al.

(10) Patent No.: US 10,956,816 B2
(45) Date of Patent: Mar. 23, 2021

(54) ENHANCING RATING PREDICTION USING REVIEWS

(71) Applicant: INTERNATIONAL BUSINESS MACHINES CORPORATION, Armonk, NY (US)

(72) Inventors: Amir Kantor, Haifa (IL); Oren Sar-Shalom, Nes Ziona (IL); Guy Uziel, Ashdod (IL)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 15/635,272

(22) Filed: Jun. 28, 2017

(65) Prior Publication Data
US 2019/0005383 A1    Jan. 3, 2019

(51) Int. Cl.
*G06N 3/08*       (2006.01)
*G06N 5/04*       (2006.01)
*G06Q 30/02*      (2012.01)
*G06N 3/04*       (2006.01)

(52) U.S. Cl.
CPC .......... *G06N 3/08* (2013.01); *G06N 5/04* (2013.01); *G06Q 30/02* (2013.01); *G06N 3/0445* (2013.01)

(58) Field of Classification Search
None
See application file for complete search history.

(56) References Cited

U.S. PATENT DOCUMENTS

| | | |
|---|---|---|
| 8,909,626 B2 | 12/2014 | Park et al. |
| 2014/0136362 A1 | 5/2014 | Shaya et al. |
| 2015/0046479 A1 | 2/2015 | Allweil et al. |
| 2016/0267377 A1 | 9/2016 | Pan et al. |
| 2016/0284003 A1 | 9/2016 | Renders |
| 2017/0249389 A1 | 8/2017 | Brovinsky et al. |
| 2017/0337481 A1* | 11/2017 | Trouillon ............... G06N 7/00 |

(Continued)

FOREIGN PATENT DOCUMENTS

WO    2012034606 A2    3/2012

OTHER PUBLICATIONS

Seo et al., Representation Learning of Users and Items for Review Rating Prediction Using Attention-based Convolutional Neural Network, 3 International Workshop on Machine Learning Methods for Recommender Systems, Apr. 27-29, 2017, Total Page: 18 (Year: 2017).*

(Continued)

*Primary Examiner* — Alan Chen
(74) *Attorney, Agent, or Firm* — Alexis N. Hatzis

(57) ABSTRACT

A method, computer system, and a computer program product for enhanced rating predictions is provided. The present invention may include receiving a user input. The present invention may then include translating the received user input into an embedding matrix and inputting the embedding matrix into a deep neural network. The present invention may further include generating, by the deep neural network, an output vector, a user bias term and an item bias term based on the embedding matrix. The present invention may then include calculating a predicted rating based on the generated output vector, the generated user bias term and the generated item bias term. The present invention may then include determining an accuracy of the predicted rating.

17 Claims, 7 Drawing Sheets

(56) References Cited

U.S. PATENT DOCUMENTS

2018/0293488 A1 10/2018 Dang et al.
2019/0278819 A1* 9/2019 Manning ............. G06F 16/9535

OTHER PUBLICATIONS

Cui et al., MV-RNN: A Multi-View Recurrent Neural Network for Sequential Recommendation, Journal of Latex Class Files, vol. 14, No. 8, Aug. 2015, pp. 1-15 (Year: 2015).*
Gao, Convolutional Neural Network Based Sentiment Analysis using Adaboost Combination, 2016 International Joint Conference on Neural Networks (IJCNN), 2016, pp. 1333-1338 (Year: 2016).*
Almahairi et al., "Learning Distributed Representations from Reviews for Collaborative Filtering," RecSys'15, Sep. 16-20, 2015, p. 147-154, ACM, Vienna, Austria.
Badaro et al., "A Hybrid Approach with Collaborative Filtering for Recommender Systems," 9th International Wireless Communications and Mobile Computing Conference (IWCMC), 2013, p. 349-354, IEEE.
Bao et al., "TopicMF: Simultaneously Exploiting Ratings and Reviews for Recommendation," Proceedings of the Twenty-Eighth AAAI Conference on Artificial Intelligence, 2014, p. 2-8, Association for the Advancement of Artificial Intelligence.
Chen et al., "Recommender Systems Based on User Reviews: The State of the Art," User Modeling and User-Adapted Interaction, Jun. 2015, p. 99-154, vol. 25, Issue 2, Springer Science+Business Media Dordrecht.
Diao et al., "Jointly Modeling Aspects, Ratings and Sentiments for Movie Recommendation (JMARS)," KDD'14, Aug. 24-27, 2014, p. 193-202, ACM, New York, NY, USA.
Jakob et al., "Beyond the Stars: Exploiting Free-Text User Reviews to Improve the Accuracy of Movie Recommendations," TSA'09, Nov. 6, 2009, p. 57-64, ACM, Hong Kong, China.
Ling et al., "Ratings Meet Reviews, a Combined Approach to Recommend," RecSys'14, Oct. 6-10, 2014, p. 105-112, ACM, Foster City, Silicon Valley, CA, USA.
McAuley et al., "Hidden Factors and Hidden Topics: Understanding Rating Dimensions with Review Text," RecSys'13, Oct. 12-16, 2013, p. 165-172, ACM, Hong Kong, China.
Mell et al., "The NIST Definition of Cloud Computing," National Institute of Standards and Technology, Sep. 2011, p. 1-3, Special Publication 800-145.
Sopchoke et al., "A Step Towards High Quality One-class Collaborative Filtering using Online Social Relationships," International Conference on Advanced Computer Science and Information Systems (ICACSIS 2011), 2011, p. 243-248, IEEE.
Wikipedia, "Collaborative Filtering," Wikipedia: the Free Encyclopedia, Last Modified on Apr. 13, 2017, p. 1-10, https://en.wikipedia.org/wiki/Collaborative_filtering, Accessed on Apr. 25, 2017.
Cheng et al., "Joint Deep Modeling of Users and Items Using Reviews for Recommendation," WSDM 2017, Feb. 6-10, 2017, p. 425-433, ACM, Cambridge, United Kingdom.

* cited by examiner

ENHANCING RATING PREDICTION USING REVIEWS

BACKGROUND

The present invention relates generally to the field of computing, and more particularly to enhancing rating predictions.

Collaborative filtering methods collect preference information from many users in an effort to predict a user's preference on a given topic based on that user's preference on other topics. The underlying idea of collaborative filtering is that if a user's preference is similar to another user's preference on one topic, then those users are more likely to have similar preferences on other topics.

SUMMARY

Embodiments of the present invention disclose a method, computer system, and a computer program product for enhanced rating predictions. The present invention may include receiving a user input. The present invention may then include translating the received user input into an embedding matrix and inputting the embedding matrix into a deep neural network. The present invention may further include generating, by the deep neural network, an output vector, a user bias term and an item bias term based on the embedding matrix. The present invention may then include calculating a predicted rating based on the generated output vector, the generated user bias term and the generated item bias term. The present invention may then include determining an accuracy of the predicted rating.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
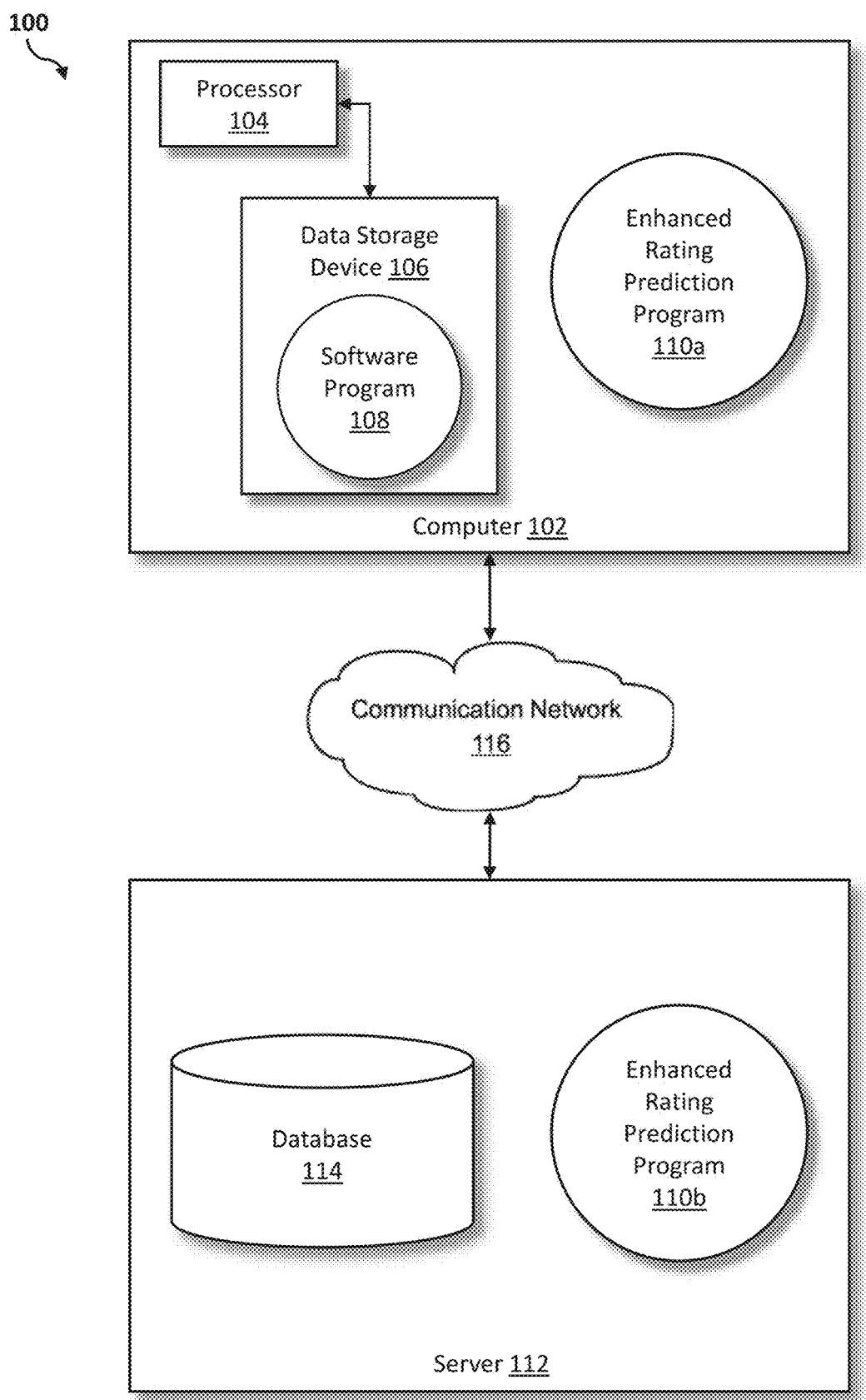
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for enhancing rating predictions. As such, the present embodiment has the capacity to improve the technical field of rating predictions by interpreting a user's textual review to provide a better understanding of the user's review and predict a user's given rating based on a matching of item traits discussed by the user. More specifically, a review by a user regarding an item may be received. Thereafter, the words in the review may be translated by an embedding matrix. The embedded words may then be fed into a deep neural network and an output vector may be generated. Each user and item may be associated with a scalar bias term, which may be mapped to the relevant user identification (i.e., ID) and item ID. Then, all entries in the output vector and the bias terms may be summed together to obtain the predicted rating corresponding to a given user and item. Using an optimization method (e.g., stochastic gradient descent or gradient descent), the loss function of the explicit rating may be minimized by learning the parameters of the learned network weight and biases.

Thereafter, a recommendation model for the explicit rating is learned, where the labels for each user and item pair are not only the actual ratings but also the appropriate predictions of the model trained above. The objective of the recommendation model is to minimize the error of the explicit rating, and to minimize the distance between the predictions of the recommendation model and the output as described above.

As described previously, collaborative filtering methods collect preference information from many users in an effort to predict a user's preference on a given topic based on that user's preference on other topics. The underlying idea of collaborative filtering is that if a user's preference is similar to another user's preference on one topic, then those users are more likely to have similar preferences on other topics. In current collaborative filtering models, a scalar may be used to represent a user's explicit rating based on calculating an inner product using the following formula:

$$(\Sigma(p_u \odot q_i) - r_{ui})^2.$$

However, the inner product outputs only a single score. The error of the explicit rating may be minimized based on calculating an inner product and adding a bias term using the following formula:

$$(\Sigma(p_u \odot q_i) + b_u + b_i - r_{ui})^2,$$

where $p_u$ represents a user vector, $q_i$ represents an item vector, $b_u$ represents a user bias, $b_i$ represents an item bias, and $r_{ui}$ represents a rating.

Therefore, it may be advantageous to, among other things, provide a way to use a collaborative filtering based recommender system that incorporates both user reviews and explicit ratings by computing the element-wise product to predict a user-item rating.

According to at least one embodiment, user reviews may be used to improve rating predictions. Within the user reviews, a user may describe what the user likes and does not like about an item. In addition to describing the preferences of the user and the traits of the item, the user review may also describe a matching between them. This is accomplished with an explicit rating, which reflects the user's overall impression of the item. However, opinions expressed in a user review may have a multi-faceted nature. This contrasts with the explicit rating the user may assign, which summarizes the entire experience in a single number.

To predict a user-item rating, the present embodiment may compute the element-wise product rather than computing the inner product of the appropriate vectors. The element-wise product may indicate to what extent the user and item match in every latent feature, while the inner product may output a single match score. By using the element-wise product, a user vector and an item vector may be generated and the enhanced rating prediction program may minimize the error of the explicit rating and a matching vector.

The present embodiment may include receiving as input a user ID, an item ID, a rating and a review. Thereafter, the collaborative reviews analyzer module may use the user ID, item ID and review to predict the given rating by first translating the words in the review into an embedding matrix and learning the embedded words. The embedded words may then be inputted into a deep neural network to yield an output vector. The output vector may be multiplied by a learned weight vector, yielding a scalar. The value of the scalar plus bias terms associated with the given user and item may produce the predicted rating.

The present embodiment may further include a collaborative filtering module to learn the user vector and item vector and to predict the explicit rating the user may give to an item based on multiplying the appropriate user vector and item vector. The collaborative filtering module may also minimize the error of the explicit rating and the distance between a matching vector and corresponding textual vectors. The present embodiment may learn based on pseudo-labels of high dimension (e.g., tens or hundreds), rather than a scalar (e.g., the explicit rating), as the scalar may not capture all matching aspects of the user and item.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an enhanced rating prediction program 110a. The networked computer environment 100 may also include a server 112 that is enabled to run an enhanced rating prediction program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the enhanced rating prediction program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the enhanced rating prediction program 110a, 110b (respectively) to use collaborative filtering to enhance rating predictions by incorporating user reviews and explicit ratings. The enhanced rating prediction method is explained in more detail below with respect to FIGS. 2-4.

Figure 2:
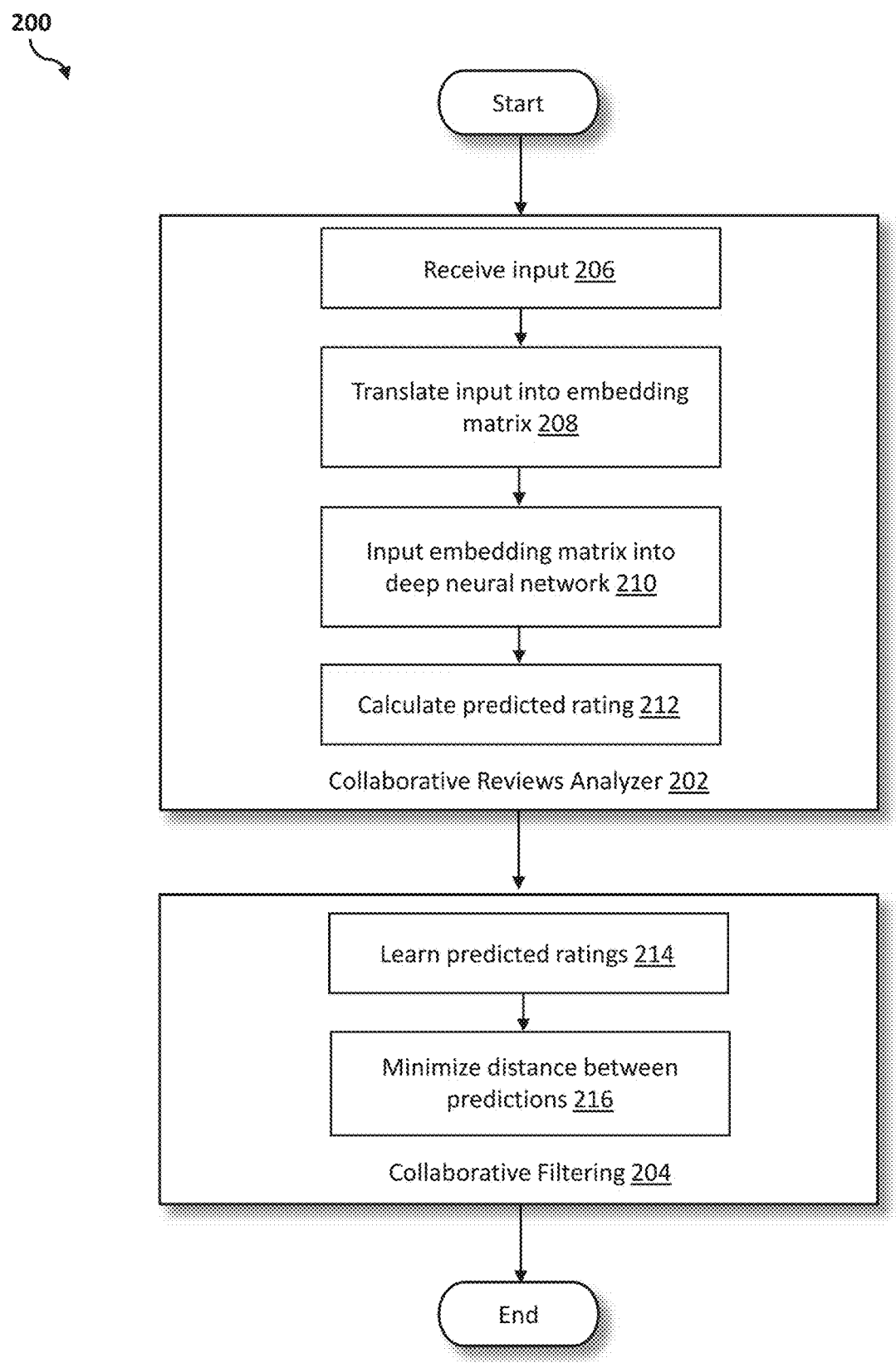
FIG. 2 is an operational flowchart illustrating a process for enhanced rating predictions according to at least one embodiment.

Referring now to FIG. 2, an operational flowchart illustrating the exemplary enhanced rating prediction process 200 used by the enhanced rating prediction program 110a and 110b according to at least one embodiment is depicted. The enhanced rating prediction process 200 may include a collaborative reviews analyzer module 202 and a collaborative filtering module 204.

At 206, the collaborative reviews analyzer module 202 receives as input text strings corresponding to a user ID, an item ID and a review. The review may be, for example, a product review for a new camera. Within the review, a user may describe a likeness towards some aspects of the product, including the zoom and camera weight. Within the same review, the user may dislike, to some extent, the camera's megapixels, and may be indifferent as to the camera's price.

Next, at 208, the input is translated into an embedding matrix. The word embedding process entails parsing the user's textual input (e.g., the review) and translating the words within the user's textual input into a vector of real numbers. Word embedding may be accomplished by using a pre-trained model, such as Word2Vec. A pre-trained model may have pre-processed a large-scale dataset, learned the dataset, and modified the given weights based on the accuracy of the learned results. Pre-trained word embeddings may be learned in a separate domain (e.g., on a different dataset) and the weights may thereafter be applied to the current dataset (i.e., the input) in order to embed the user's review into an embedding matrix. The matrix dimensions may consist of the number of words contained in the user's review and the vector dimensions of each word.

For example, the word embedding process may translate the words within the user's detailed camera review into a vector of real numbers, which will vary based on the pre-trained model and the dataset used by the collaborative reviews analyzer module 202. The pre-trained word embedding weights will be applied to the user's camera review to embed the review into an embedding matrix. The matrix dimensions will be the number of words in all users' reviews (e.g., 50,000) by the vector dimensions of each word in the reviews (e.g., 100).

At 210, the embedding matrix is fed into a deep neural network. A convolutional neural network (i.e., CNN) or other model which translates text to a vector may be used. A CNN may be made up of neurons consisting of learnable weights and biases. A CNN may be architecturally comprised of separate and distinct layers, for example, a convolutional layer, a max pooling layer, and a fully connected layer.

The convolutional layer within the CNN may consist of one or more filters used to encode (e.g., highlight) a portion of the matrix. The filter may also be referred to as a sliding window, as only the encoded portion of the matrix may be exposed. The exposed portion of the matrix may be referred to as the receptive field, and the sliding window process may be referred to as convolving. The exposed portion of the matrix may be multiplied by a predefined variable within the filter. This process may be referred to as element-wise multiplication, and may be repeated for every portion of the matrix. The product of all element-wise multiplications at each portion of the matrix may be placed in a resulting matrix. If the convolutional layer within the CNN consists of more than one filter, then the element-wise multiplication may be computed for each filter.

The max pooling layer within the CNN may consist of identifying the maximum value in a max filter space to reduce the dimensionality and complexity of the CNN. The max pooling layer may traverse every portion of the resulting matrix exposed by a max filter and may identify the largest value from the exposed portion and place this value in a new matrix. Every value in the new matrix will represent the maximum value of a region of the input to the max pooling layer. The max pooling layer of the CNN may prevent the model from overfitting the data or being too closely fit to a given input.

The fully connected layer of the CNN may take as input the result of the max pooling layer which may have preceded it and may determine which features of the matrix correlate most closely to pre-trained biases. Each portion of the inputted matrix (e.g., each user ID and item ID) may be connected to a neuron in the pre-trained CNN. The resulting connections may be arranged in a new vector, referred to as the textual compatibility vector. The textual compatibility vector may provide a mapping between a user ID, an item ID, and a corresponding scalar representing a bias. The bias may be a positive or negative variable depending on the correlation to the user ID or the item ID. By default, prior to running the CNN, the bias may be configured to equal zero and the CNN may be a Gaussian distribution with a median zero and standard deviation of predefined value. The bias may assist the CNN in predicting the actual rating that a user may give to an item. The bias may be a learned value.

Continuing with the above example, if there are three filters within the CNN, the first being of size 3×100, each filter will do matrix multiplication between a variable in the filter and a slice of the user review based on the given window size (e.g., 3×100 for the first filter). The dimensions of the filters will be predefined. Since there are three filters, the result will be three different matrices. The max pooling layer will concatenate all three matrices into a single matrix and extract the maximum value. Lastly, the fully connected layer will multiply the max pooling layer by a learned matrix to generate the textual compatibility vector, made up of many dimensions. The sum of the learned user bias, item bias and values within the textual compatibility vector should closely resemble the user's actual rating. If the prediction is too high, then the parameters (i.e., the user bias, item bias and parameters of the CNN) will be corrected.

Next, at 212, the predicted rating is calculated. The CNN may calculate the predicted rating by summing the item bias, user bias, and all values (e.g., scalars) of the textual compatibility vector. The predicted rating may represent the overall numerical assessment that a user gave to an item based on the user's textual review of that item. The predicted rating may be compared to the actual rating to determine the accuracy of the predicted rating. The item bias, user bias, or textual compatibility vector may be modified depending on the accuracy of the predicted rating.

The CNN may summarize a review into a compatibility vector $c_{ui}$, representing the experience of user u with item i over the various latent features. A user vector may be denoted as $p_u$, and an item vector may be denoted as $q_i$.

At 214, the predicted ratings are learned. The predicted ratings may be generated in the collaborative reviews analyzer module 202 and inputted into the collaborative filtering module 204. The user vector $p_u$ and item vector $q_i$ may also be inputted into and learned by the collaborative filtering module 204. The collaborative filtering module 204 may predict a user's rating by calculating a weighted average of the ratings of other users. A bias may be assigned to each user vector and item vector. The learning may be successful when the multiplication of the user vector and item vector, plus the item bias and user bias, closely resemble the user's actual rating. The multiplication of the user vector and item vector may be done by computing the inner product, for example, by multiplying each dimension in one vector by a dimension in another vector (i.e., pairwise multiplication) and then taking the sum of those products. The pairwise multiplication may also be referred to as computing the element-wise product. The predicted rating may be a compatibility vector with objective:

$$\|p_u \odot q_i - c_{ui}\|_2.$$

Next, at 216, the collaborative filtering module 204 minimizes the loss between the predictions. The predicted ratings generated during the CNN may be compared to the predicted ratings generated during the collaborative filtering module 204. To compare the distance between the vectors, the partial derivative of each user element and item element within the vector may be computed with respect to the Euclidian distance. If the predicted ratings are not alike, then the user vector and item vector may be modified. The loss function may also minimize the distance between the sum of the textual compatibility vector, user bias and item bias of each module.

For example, in another camera review, a user may write on an item the following review, and give the item a 5-star rating: "This camera has a clear picture quality. It is lightweight and is very easy to use. However, it is priced on the expensive side." The enhanced rating prediction program 110a, 110b may receive the reviews made on the item, as discussed previously at 206, by having been implemented on a webpage and searching through textual reviews made for items on that webpage. The objective of the enhanced rating prediction program 110a, 110b is to represent the user and the item with vectors as described previously at 208. Each dimension in the vectors is a combination of the latent features which may correlate to the price of the item and the price preference of the user, the camera quality, or the weight. Using the CNN, as described previously at 210, the text is represented as a vector. Each dimension of the vector expresses the appropriate latent features of the user and the item. In the given example, since there is a positive matching between the picture quality, weight, and ease of use, and only a mismatch in the price, most of the dimensions in the vector will be positive values. The CNN within the enhanced rating prediction program 110a, 110b will aim to obtain a matching vector, a user bias and an item bias, such that the sum of all three will be close to the maximum rating of 5 (e.g., the highest possible rating). If, based on the mismatch in price, the sum of the elements in the matching vector is only 3.5, then the sum of the user bias and item bias will be around 1.5. Next, during the collaborative filtering module 204, as described previously at 214 and 216, the enhanced rating prediction program 110a, 110b will attempt to obtain a user vector and an item vector such that their element-wise product will be as close as possible to the matching vector, and that the inner product of their vectors plus the user bias and item bias will be as close to 5 as possible.

Figure 3:
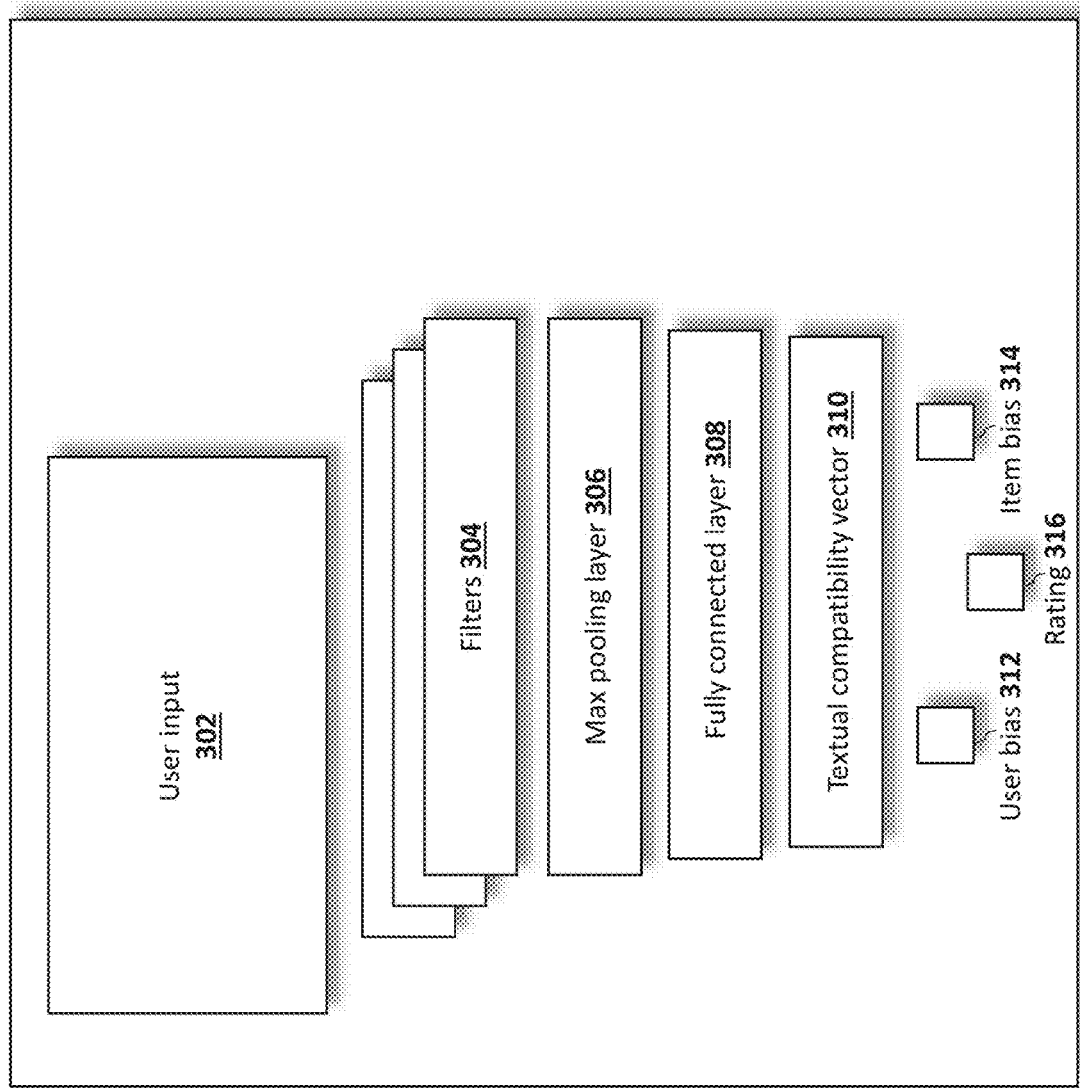
FIG. 3 is a block diagram of the collaborative reviews analyzer module of the enhanced rating prediction program with convolutional neural network according to at least one embodiment.

Referring now to FIG. 3, a block diagram of the collaborative reviews analyzer module 300 of the enhanced rating prediction program 110a, 110b with convolutional neural network according to at least one embodiment is depicted. User input 302 is received by the collaborative reviews analyzer module 300 as described previously at 206. The user input is then translated into an embedding matrix as described previously at 208 and the embedding matrix is fed into a deep neural network as described previously at 210. The deep neural network is a convolutional neural network consisting of three filters 304, a max pooling layer 306, a fully connected layer 308, and a textual compatibility vector 310. The textual compatibility vector 310 consists of a user bias 312, an item bias 314, and a rating 316, and is calculated in a manner as described previously at 212.

Figure 4:
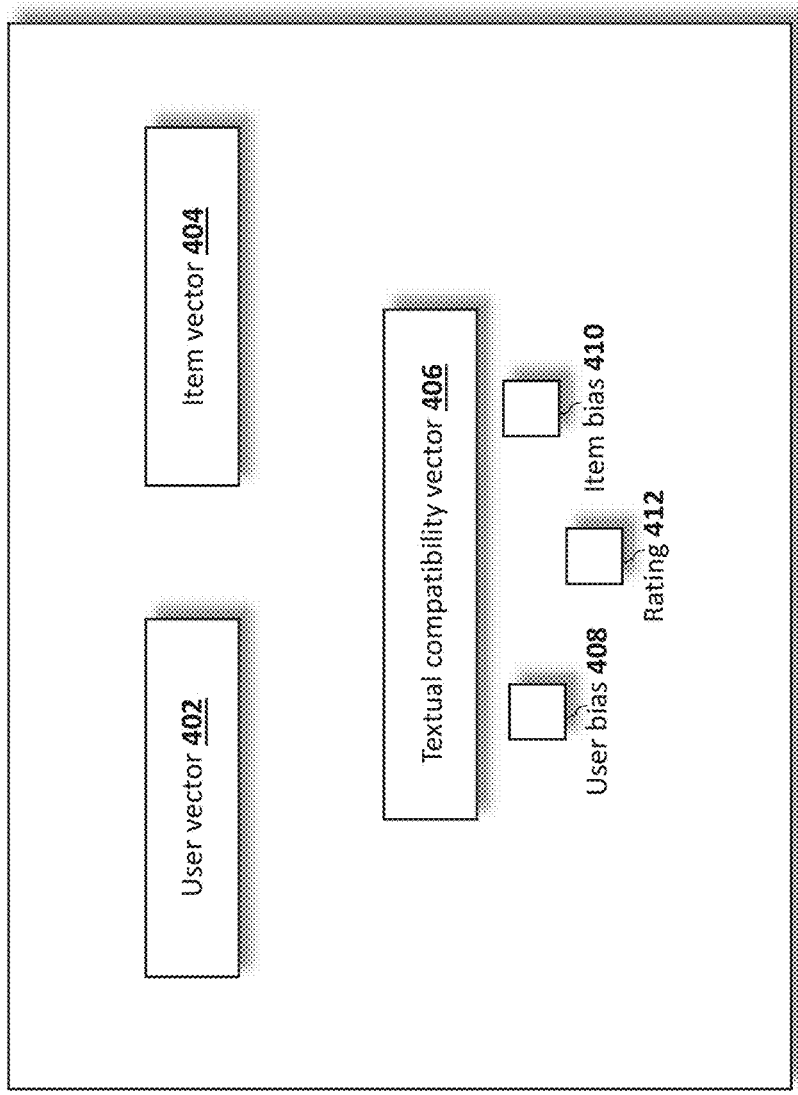
FIG. 4 is a block diagram of the collaborative filtering module of the enhanced rating prediction program with convolutional neural network according to at least one embodiment.

Referring now to FIG. 4, a block diagram of the collaborative filtering module 400 of the enhanced rating prediction program 110a, 110b with convolutional neural network according to at least one embodiment is depicted. A user vector 402 and item vector 404 are inputted into the collaborative filtering module 400 and the predicted ratings are learned as described previously at 214. A textual compatibility vector 406 consisting of a user bias 408, an item bias 410, and a rating 412, is generated and the distance between the textual compatibility vector 406 and the result of the collaborative reviews analyzer module 202 is generated to minimize the distance between the predictions as described previously at 216.

It may be appreciated that FIGS. 2-4 provide only an illustration of one embodiment and do not imply any limitations with regard to how different embodiments may be implemented. Many modifications to the depicted embodiment(s) may be made based on design and implementation requirements. For example, according to another embodiment of the enhanced rating prediction program 110a, 110b, a recurrent neural network (i.e., RNN) may be used.

According to yet another embodiment of the enhanced rating prediction program 110a, 110b, all parameters may be learned together (e.g., as opposed to first learning the collaborative reviews module 300 and then learning the collaborative filtering module 400). The advantage of learning all parameters together may be stronger learning (e.g., being given a detailed description of the user's opinion of the item rather than a single score). A stronger signal may train a weaker signal and less noise may be introduced into the system. When learning all parameters together, a strength of one method may compensate for a weakness of another.

Figure 5:
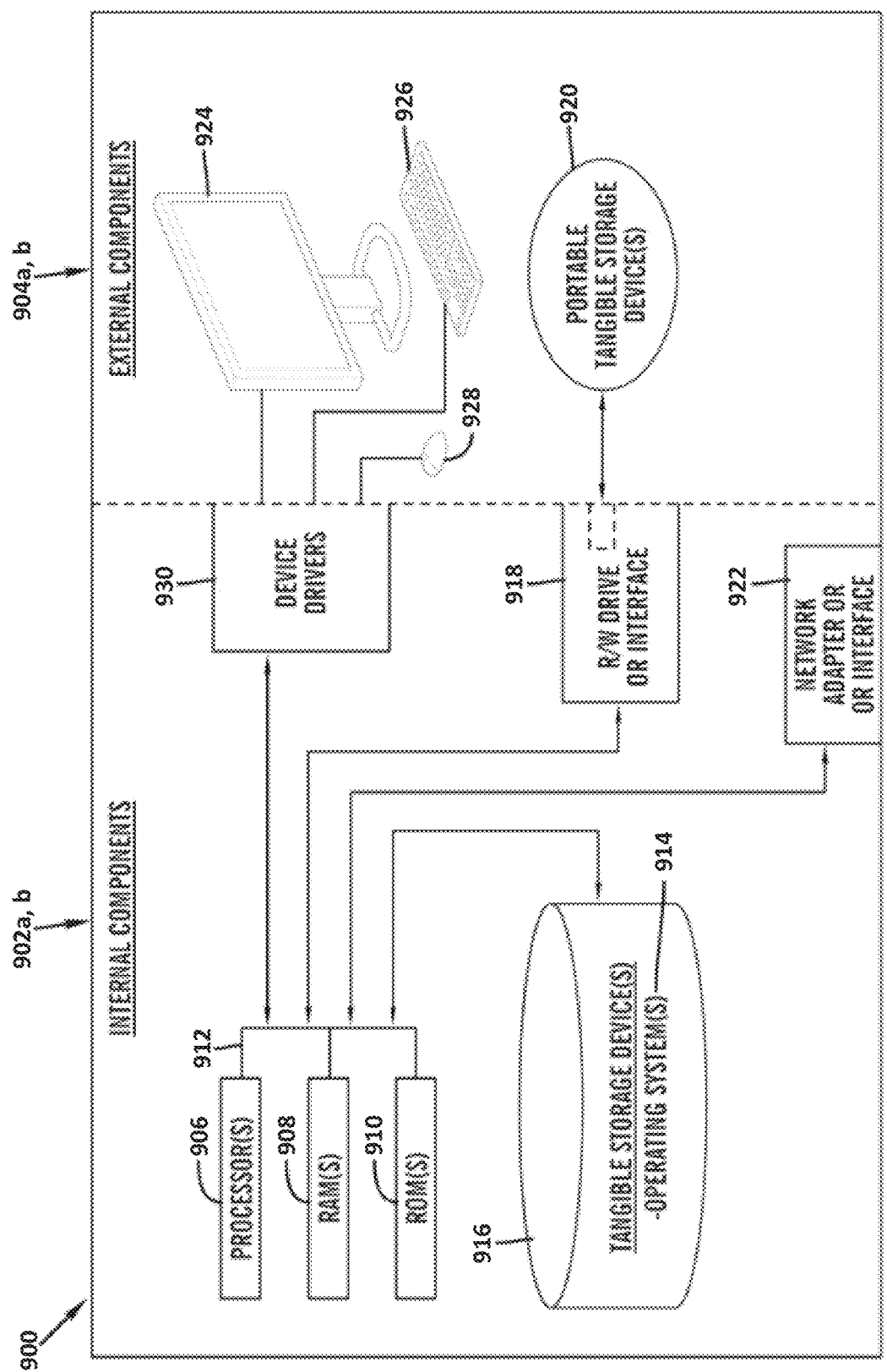
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the enhanced rating prediction program 110a in client computer 102, and the enhanced rating prediction program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the enhanced rating prediction program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the enhanced rating prediction program 110a in client computer 102 and the enhanced rating prediction program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the enhanced rating prediction program 110a in client computer 102 and the enhanced rating prediction program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
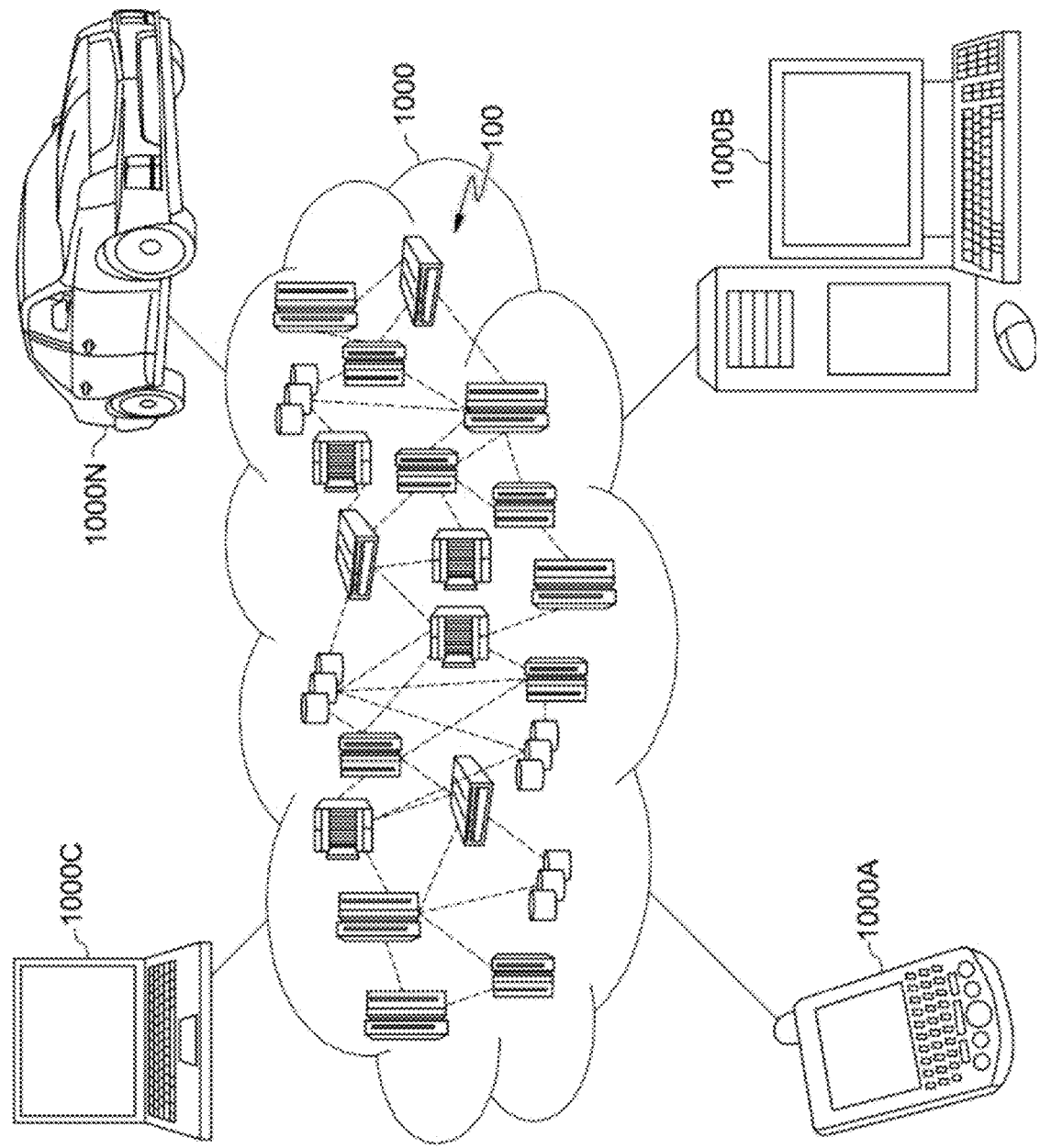
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
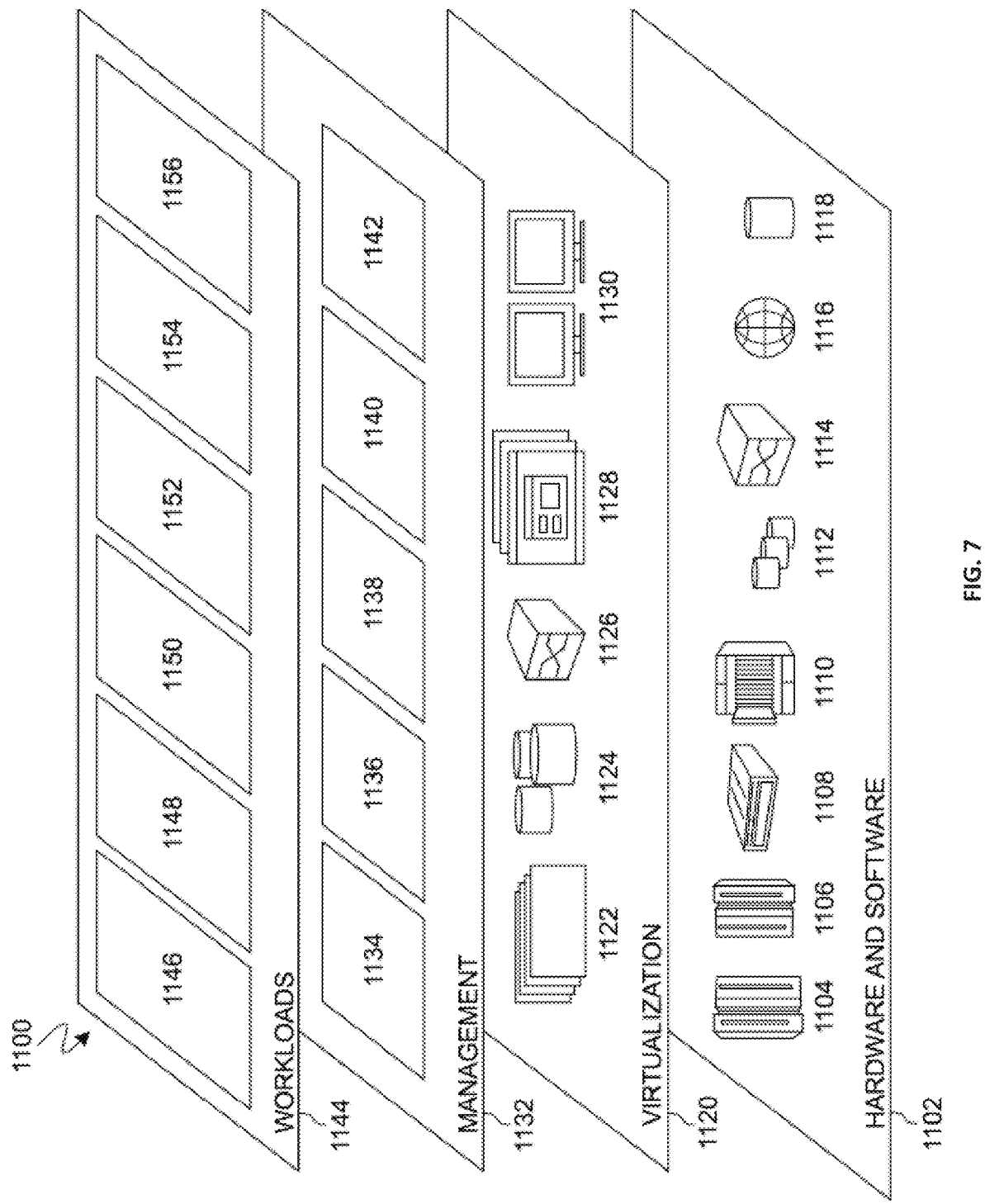
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and enhanced rating prediction 1156. An enhanced rating prediction program 110a, 110b provides a way to predict a user's preference on a given topic based on that user's preference on other topics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhanced rating predictions, the method comprising:
   receiving a user input;
   translating the received user input into an embedding matrix;
   inputting the embedding matrix into a deep neural network;
   generating, by the deep neural network, an output vector, a user bias term and an item bias term based on the embedding matrix;
   calculating a predicted rating based on the generated output vector, the generated user bias term and the generated item bias term, wherein the calculated predicted rating is computed based on an element-wise product; and
   determining an accuracy of the predicted rating.

2. The method of claim 1, wherein the received user input includes a user ID, an item ID, and a rating.

3. The method of claim 1, wherein the deep neural network is selected from the group consisting of a convolutional neural network and a recurrent neural network.

4. The method of claim 1, wherein the calculated predicted rating further comprises a sum of the generated output vector, the user bias term and the item bias term.

5. The method of claim 4, further comprising:
   learning the calculated predicted ratings; and
   generating a second predicted rating based on the learned calculated predicted ratings.

6. The method of claim 5, further comprising:
   using stochastic gradient descent to minimize a distance between the second predicted rating and the learned calculated predicted ratings.

7. A computer system for enhanced rating predictions, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a user input;
   translating the received user input into an embedding matrix;
   inputting the embedding matrix into a deep neural network;
   generating, by the deep neural network, an output vector, a user bias term and an item bias term based on the embedding matrix;
   calculating a predicted rating based on the generated output vector, the generated user bias term and the generated item bias term, wherein the calculated predicted rating is computed based on an element-wise product; and
   determining an accuracy of the predicted rating.

8. The computer system of claim 7, wherein the received user input includes a user ID, an item ID, and a rating.

9. The computer system of claim 7, wherein the deep neural network is selected from the group consisting of a convolutional neural network and a recurrent neural network.

10. The computer system of claim 9, wherein the calculated predicted rating further comprises a sum of the generated output vector, the user bias term and the item bias term.

11. The computer system of claim 10, further comprising:
learning the calculated predicted ratings; and
generating a second predicted rating based on the learned calculated predicted ratings.

12. The computer system of claim 11, further comprising:
using stochastic gradient descent to minimize a distance between the second predicted rating and the learned calculated predicted ratings.

13. A computer program product for enhanced rating predictions, comprising:
one or more computer-readable storage medium and program instructions stored on at least one of the one or more tangible storage medium, the program instructions executable by a processor, the program instructions comprising:
program instructions to receive a user input;
program instructions to translate the received user input into an embedding matrix;
program instructions to input the embedding matrix into a deep neural network;
program instructions to generate, by the deep neural network, an output vector, a user bias term and an item bias term based on the embedding matrix;
program instructions to calculate a predicted rating based on the generated output vector, the generated user bias term and the generated item bias term, wherein the calculated predicted rating is computed based on an element-wise product; and
program instructions to determine an accuracy of the predicted rating.

14. The computer program product of claim 13, wherein the received user input includes a user ID, an item ID, and a rating.

15. The computer program product of claim 13, wherein the deep neural network is selected from the group consisting of a convolutional neural network and a recurrent neural network.

16. The computer program product of claim 13, wherein the calculated predicted rating further comprises a sum of the generated output vector, the user bias term and the item bias term.

17. The computer program product of claim 16, further comprising:
program instructions to learn the calculated predicted ratings; and
program instructions to generate a second predicted rating based on the learned calculated predicted ratings.

* * * * *